Figure 1:
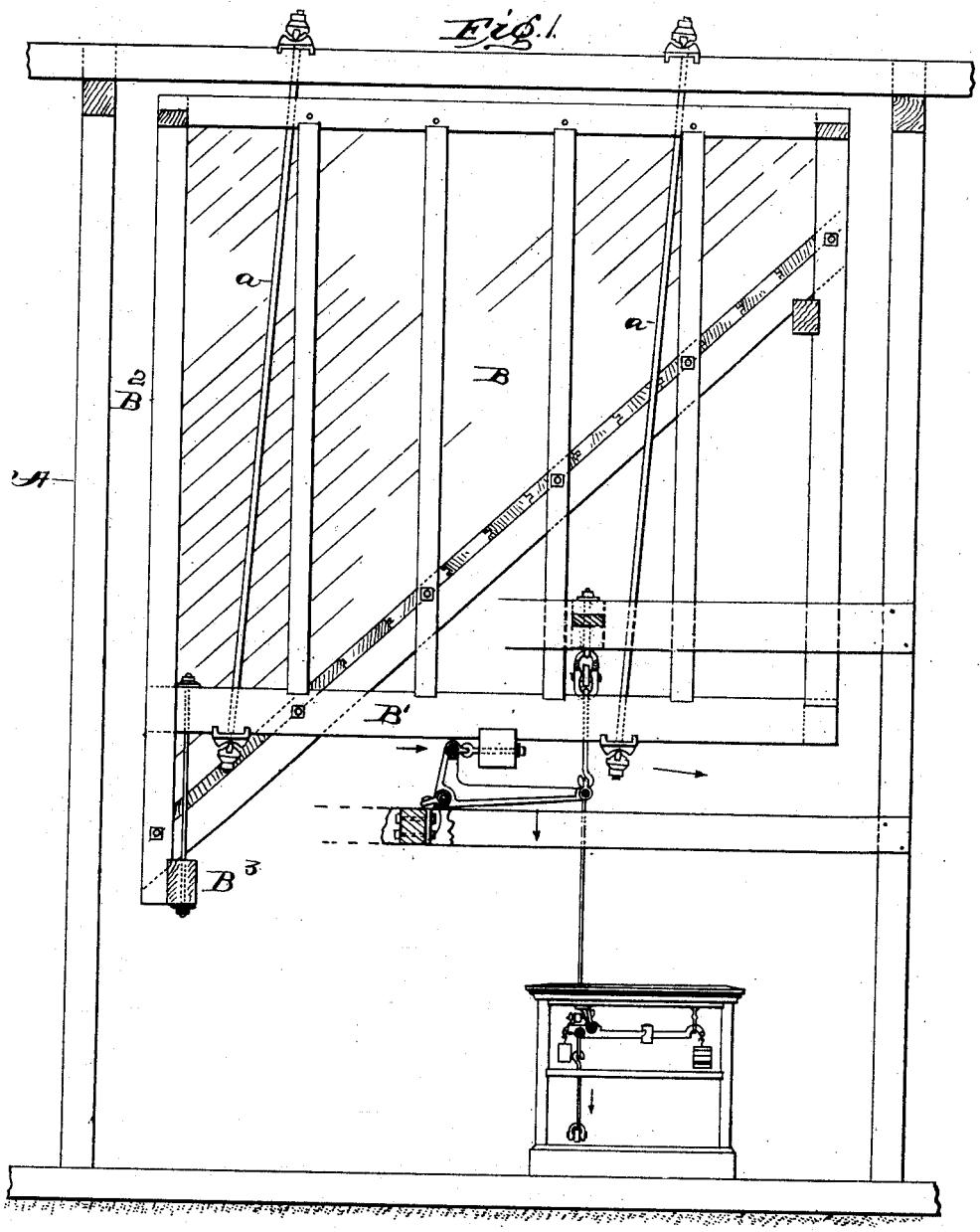

No. 666,983. Patented Jan. 29, 1901.
L. G. SPENCER & F. W. TAYLOR.
WEIGHING MACHINE.
(Application filed May 3, 1900.)
(No Model.) 3 Sheets—Sheet 1.

WITNESSES:
Grace P. Brereton
Albert Popkins

INVENTORS
Luke G. Spencer
Frederick W. Taylor
BY
ATTORNEY

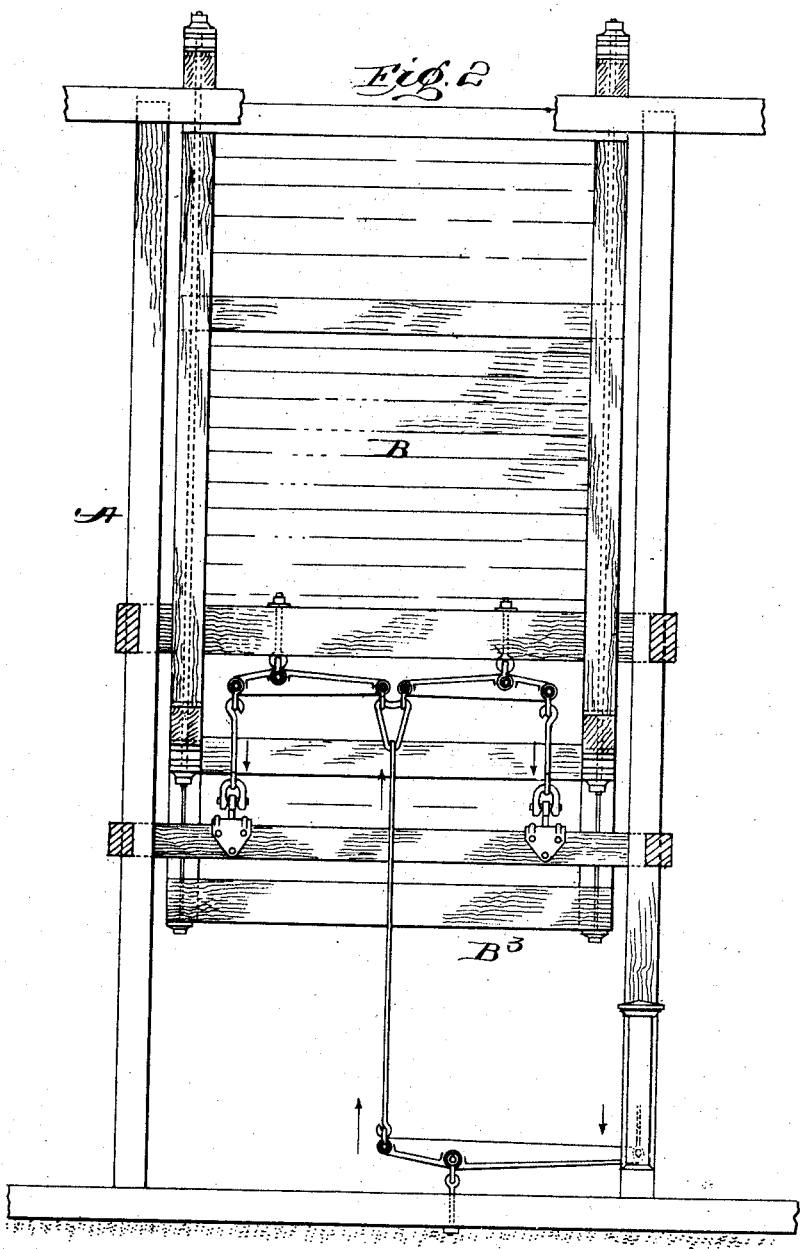

No. 666,983. Patented Jan. 29, 1901.
L. G. SPENCER & F. W. TAYLOR.
WEIGHING MACHINE.
(Application filed May 3, 1900.)
(No Model.) 3 Sheets—Sheet 3.
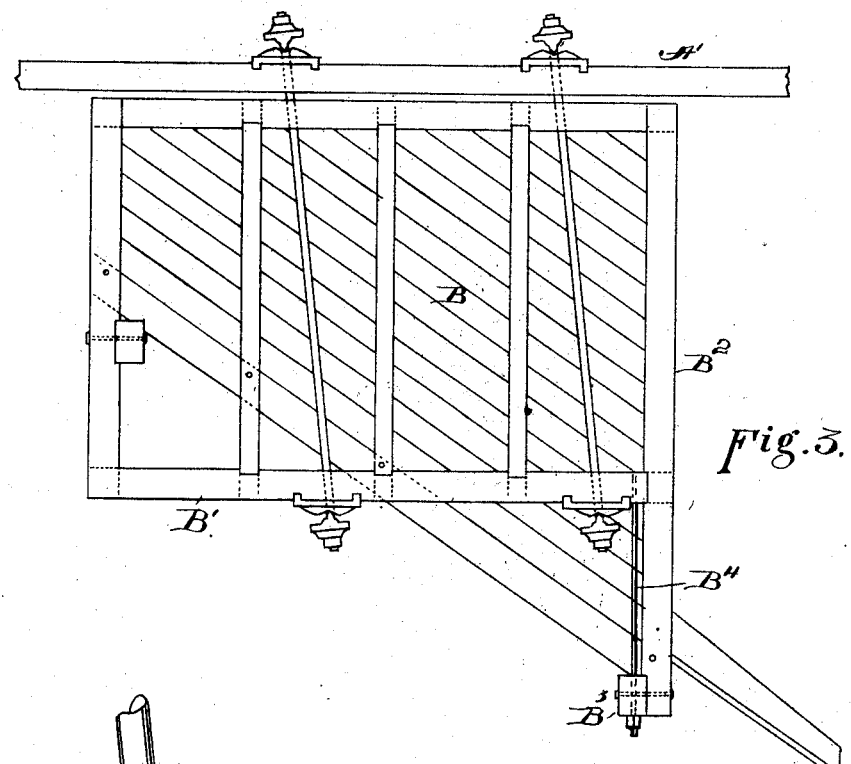
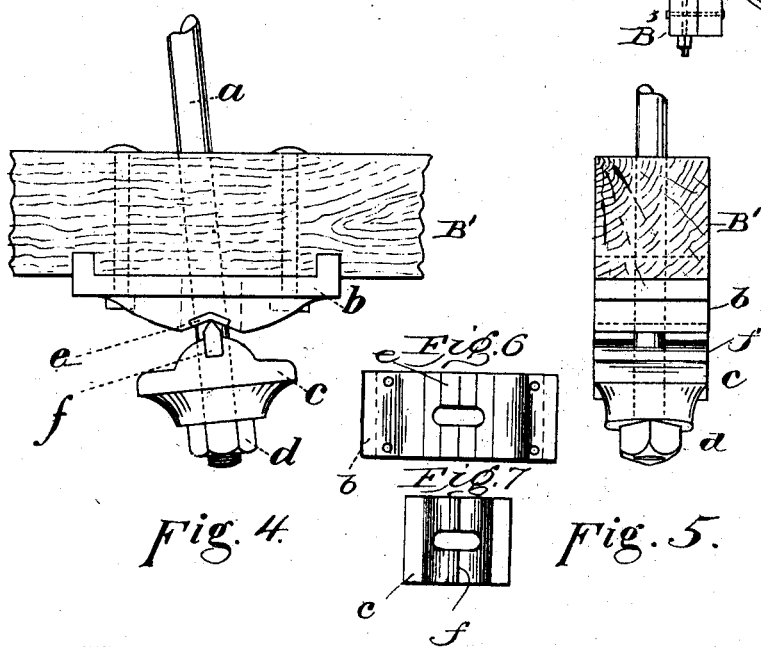
WITNESSES:
Grace P. Brereton
H. Pennock
INVENTORS
Luke G. Spencer
Frederick W. Taylor
BY
C. D. Sturtevant
ATTORNEYS.

UNITED STATES PATENT OFFICE.

LUKE G. SPENCER AND FREDERICK W. TAYLOR, OF ST. JOHNSBURY, VERMONT, ASSIGNORS TO THE E. & T. FAIRBANKS & COMPANY, OF SAME PLACE.

WEIGHING-MACHINE.

SPECIFICATION forming part of Letters Patent No. 666,983, dated January 29, 1901.

Application filed May 3, 1900. Serial No. 15,347. (No model.)

*To all whom it may concern:*

Be it known that we, LUKE G. SPENCER and FREDERICK W. TAYLOR, citizens of the United States, residing at St. Johnsbury, in the county of Caledonia, State of Vermont, have invented certain new and useful Improvements in Weighing-Machines, of which the following is a description, reference being had to the accompanying drawings and to the letters of reference marked thereon.

Our invention relates to that class of weighing machines designed, primarily, for weighing and delivering coal to locomotives.

The objects of the invention are to simplify the construction and render more effective the operation of such machines.

The invention will first be described and then specifically pointed out in the claims.

The objects we attain by the mechanism illustrated in the accompanying drawings, in which—

Figure 1 is a side elevation, partly in section, of our improved weighing apparatus. Fig. 2 is a rear elevation of the same. Fig. 3 is an enlarged side elevation of the weighing-pocket. Figs. 4 and 5 are details of the bearings for the hopper-supporting rods, and Fig. 6 is a top view of the bearing-plate.

A designates a vertically-disposed framework in the upper part of which is suspended the pocket or hopper B, adapted to move horizontally rearward against the action of the scale mechanism, as will hereinafter appear. The pocket B is suspended by means of four straight rods $a$ of equal lengths and provided with caps $c$ at their opposite ends, in the adjacent inner faces of which are set the knife-edge pivots $f$. These caps are held in place by means of the adjusting-nuts $d$ on the ends of the rods. The pivots $f$ bear upon the V-shaped steels $e$, set in the outer faces of the bearing-plates $b$. (See Fig. 4.) These bearing-plates $b$ for the upper ends of the rods are secured to the upper cross-bars A' of the frame, while the lower bearing-plates are secured to the lower horizontal side bars B' of the pocket. The vertical front bars $B^2$ extend down below the bars B' to the lower edge of the inclined bottom of the pocket, and a cross-bar $B^3$ extends across the lower side of said bottom and is bolted at its ends to the ends of the bars $B^2$, as shown in Fig. 3. To further support and strengthen this lower forward portion of the hopper where the greatest weight comes, we connect the horizontal bars B' with the ends of the transverse bar $B^3$ by means of the long bolts $B^4$. (See Fig. 3.)

The pocket is so suspended as to cause the rods $a$ to normally incline forward of the perpendicular in order that when loaded the pocket will move rearwardly in a horizontal direction. Four straight rods of equal length are more effective than jointed suspension-rods and at the same time are simpler and less expensive.

The caps $c$ and bearing-plates $b$, by reason of their construction, are capable of use at either end of rods $a$, which constitutes a material improvement over constructions which necessitate differently-constructed upper and lower bearings.

In this apparatus the weight of the load is not transmitted to the scale or pointer mechanism from a dynamometer, as in a prior apparatus, but an improved lever mechanism is employed instead, as will now be described.

D D are two levers pivotally suspended near their short outer ends from a cross-beam $A^4$ of the main frame A, and these short outer ends are in turn connected by depending rods E E with the forward ends of the long arms of vertically-rocking elbow-levers F F, hinged at their angles to a cross-beam $A^5$. The upwardly-extending shorter arms of the levers F are pivotally connected to a cross-bar $B^7$ on the lower middle portion of the pocket B, as best shown in Fig. 1, so that as the pocket moves to the rear it will pull on the short arms of levers F, and thereby cause their long arms to move down and pull on the short arms of levers D to cause their longer arms to exert an upward pull on the long transmitting-rod G, to which they are linked, as shown in Fig. 2. The lower end of the rod G is pivotally connected to the short arm of a horizontal lever H at the lower end of the frame A, said lever H being fulcrumed on a bar H' and connected at the end of its longer arm by a rod $H^2$ to a scale-beam I or to a spring-dial, as may be preferred. This scale-beam or other weight-indicating device may be arranged at any convenient point.

Having thus described our invention, what we claim as new, and desire to secure by Letters Patent, is—

1. In a weighing apparatus, the combination with a framework, of a pocket or hopper for the articles to be weighed inclosed therein, four rods supporting said pocket or hopper, bearing-plates attached to the framework at each end of said rods and consisting of castings with steels set therein, and castings secured upon the ends of said rods and provided with pivots set in to rest upon the bearings in the plates, a lever mechanism connected to the pocket or support and acted upon by the horizontal movement thereof, and a scale mechanism for indicating the weight of the load; substantially as described.

2. In a weighing apparatus, the combination with a frame, four bearing-plates thereon having central openings, suspension-rods extending down through said bearing-plates and provided with caps having pivot edges engaging said bearing-plates, a horizontally-movable pocket or support having similar but oppositely-facing bearing-plates through which the lower ends of said rods pass, similar caps on the lower ends of said rods and having pivot edges on their upper faces engaging the lower faces of the bearing-plates, and a scale mechanism to indicate the pressure of the pocket or scale in moving horizontally under a load; substantially as described.

3. The combination with the frame, of a horizontally-movable pocket suspended to move horizontally under a load, elbow-levers on the frame and upon which the pocket pulls in so moving transverse levers mounted on the frame and connected at their short ends to the long arms of the elbow-levers, a transmitting-rod linked to the adjacent ends of said transverse levers, and a scale mechanism connected to the lower end of said rod; substantially as described.

4. In a weighing-machine, the combination with a frame, of the pocket having an inclined bottom, horizontal top and bottom side bars, vertical front bars extended at their lower ends below the lower side bars to the spout or delivery end of the inclined bottom, a cross-bar extending under said bottom and secured at its ends to the lower ends of said vertical bars, and vertical bolts connecting the ends of said cross-bar with the forward ends of said lower horizontal side bars, four rods suspending the pocket from the upper frame-bars so as to permit it to move horizontally under a load, and a scale mechanism; substantially as described.

5. In a weighing apparatus, a suspension-rod provided with caps having knife-edge pivots on their inner faces, and bearing-plates, through which the rods pass having V-shaped steels set in their outer faces and engaged by the knife-edge pivots; substantially as described.

6. In a weighing apparatus, a suspension-rod having threaded outer ends provided with nuts, caps on the rods adjacent to the nuts and having knife-edge pivots on their inner faces, and similarly-constructed bearing-plates through which the rods pass, having V-shaped steels set in their outer faces and engaged by the knife-edge pivots; substantially as described.

7. The combination with the frame, of a horizontally-movable pocket or support, four rods suspending said pocket from the frame so as to permit it to move horizontally under a load, vertically-rocking elbow-levers pivoted at their angles to the frame under the pocket or support, and connected at the upper ends of their short arms to the pocket or support, transverse levers also pivoted to the frame linked at their short ends to the long arms of the elbow-levers, a vertical rod to the upper end of which the inner adjacent ends of said transverse levers are connected, a lever pivoted at the lower end of the frame, and connected at its short arm with the lower end of said rod, and a scale mechanism connected with the long arm of the last-named lever; substantially as described.

In testimony whereof we affix our signatures in presence of two witnesses.

LUKE G. SPENCER.
FREDERICK W. TAYLOR.

Witnesses:
C. H. HORTON,
J. M. CODY.